US012627136B2

(12) United States Patent
Zeller

(10) Patent No.: US 12,627,136 B2
(45) Date of Patent: May 12, 2026

(54) ELECTRICAL DEVICE WITH INDIRECT LIGHTNING PROTECTION, ATTITUDE AND HEADING REFERENCE SYSTEM, AND AIRCRAFT

(71) Applicant: Northrop Grumman Litef GmbH, Freiburg (DE)

(72) Inventor: Peter Zeller, Freiburg (DE)

(73) Assignee: NORTHROP GRUMMAN LITEF GMBH, Freiburg (DE)

( * ) Notice: Subject to any disclaimer, the term of this patent is extended or adjusted under 35 U.S.C. 154(b) by 118 days.

(21) Appl. No.: 18/702,492

(22) PCT Filed: Sep. 15, 2022

(86) PCT No.: PCT/EP2022/075711
§ 371 (c)(1),
(2) Date: Apr. 18, 2024

(87) PCT Pub. No.: WO2023/066575
PCT Pub. Date: Apr. 27, 2023

(65) Prior Publication Data
US 2024/0421590 A1      Dec. 19, 2024

(30) Foreign Application Priority Data

Oct. 20, 2021     (DE) .......................... 102021127228.9

(51) Int. Cl.
*H02H 9/00*          (2006.01)
*H02H 9/02*          (2006.01)
(Continued)

(52) U.S. Cl.
CPC .............. *H02H 9/005* (2013.01); *H02H 9/02* (2013.01); *H04B 5/22* (2024.01); *H04B 5/266* (2024.01)

(58) Field of Classification Search
CPC ............ H02H 9/005; H02H 9/02; H02H 1/04; H02H 7/20; H04B 5/22; H04B 5/266; H04B 5/79; H04B 5/75; H04B 5/72
(Continued)

(56) References Cited

U.S. PATENT DOCUMENTS 4,586,104 A          4/1986  Standler
5,903,426 A  *      5/1999  Ehling ................... H02H 9/042
                                                                 361/91.1
(Continued)

FOREIGN PATENT DOCUMENTS

DE            60225653 T2      4/2009
DE       102011004699 A1    12/2012
(Continued)

OTHER PUBLICATIONS

International Search Report and Written Opinion for corresponding PCT/EP2022/07 5711, mailed Jan. 9, 2023, 13 pgs.

*Primary Examiner* — Dharti H Patel
(74) *Attorney, Agent, or Firm* — Tarolli, Sundheim, Covell & Tummino LLP

(57)          ABSTRACT

An electrical device is disclosed, with indirect lightning protection, having an electrically conductive housing for housing electrical components. The electrical device has an electrical data interface connected to the electrical components in order to transmit electrical signals from the components out of the housing, or in order to transmit external electrical signals into the housing in the components. An electrical power supply interface is provided, which supplies the electronic components with electrical power from an external power source. The electrical data interface and the electrical power supply interface are constructed in such a way that the electrical components are galvanically isolated from the housing and the input/output lines of the data interface and the power supply interface, such that damage (Continued)

to the components by a current pulse brought about by lightning is prevented. An attitude and heading reference system and an aircraft comprising the electrical device are further provided.

12 Claims, 6 Drawing Sheets

(51) Int. Cl.
*H04B 5/22* (2024.01)
*H04B 5/26* (2024.01)

(58) Field of Classification Search
USPC .......................................................... 361/117
See application file for complete search history.

(56) References Cited

U.S. PATENT DOCUMENTS

| | | | | |
|---|---|---|---|---|
| 6,152,597 | A * | 11/2000 | Potega .............. | H01M 10/4257 |
| | | | | 327/512 |
| 10,124,691 | B1 * | 11/2018 | Failing ................... | B60L 53/67 |

| | | | | |
|---|---|---|---|---|
| 2004/0042141 | A1 * | 3/2004 | Mikolajczak .......... | H05K 1/141 |
| | | | | 361/103 |
| 2006/0277346 | A1 * | 12/2006 | Doak .................... | G06F 13/387 |
| | | | | 710/305 |
| 2009/0219656 | A1 * | 9/2009 | Lindsey ................. | H02H 7/268 |
| | | | | 361/42 |
| 2011/0199943 | A1 | 8/2011 | Guillot et al. | |
| 2012/0130658 | A1 * | 5/2012 | Dawley .................. | H01R 13/66 |
| | | | | 702/62 |
| 2014/0146455 | A1 * | 5/2014 | Abdelsamie ............. | G06F 1/16 |
| | | | | 361/679.02 |
| 2016/0352097 | A1 | 12/2016 | Engelvin et al. | |
| 2018/0041249 | A1 | 2/2018 | Guillot | |
| 2019/0199137 | A1 | 6/2019 | Jiang et al. | |
| 2019/0304630 | A1 * | 10/2019 | Goergen ................ | H01B 9/003 |
| 2023/0178980 | A1 * | 6/2023 | Gutsul ................. | H10D 89/611 |
| | | | | 361/56 |
| 2023/0352933 | A1 * | 11/2023 | Liao ........................ | H02H 9/046 |
| 2025/0141493 | A1 * | 5/2025 | Clark .................. | H02J 7/00036 |
| 2025/0193034 | A1 * | 6/2025 | Zheng ........................ | G06F 1/26 |

FOREIGN PATENT DOCUMENTS

| | | | |
|---|---|---|---|
| DE | 102019202241 | A1 | 8/2020 |
| DE | 102019107641 | A1 | 10/2020 |

* cited by examiner

| Threat level | Waveforms | | |
|---|---|---|---|
| | 3/3 | 4/1 | 5A/5A |
| | Voc/Isc | Voc/Isc | Voc/Isc |
| 1 | 100/4 | 50/10 | 50/50 |
| 2 | 250/10 | 125/25 | 125/125 |
| 3 | 600/24 | 300/60 | 300/300 |
| 4 | 1500/60 | 750/150 | 750/750 |
| 5 | 3200/128 | 1600/320 | 1600/1600 |

Threat level

ELECTRICAL DEVICE WITH INDIRECT LIGHTNING PROTECTION, ATTITUDE AND HEADING REFERENCE SYSTEM, AND AIRCRAFT

This application is a U.S. National Stage Application filed under 35 U.S.C. § 371 of PCT/EP2022/075711, filed Sep. 15, 2022, and entitled "ELECTRICAL DEVICE WITH INDIRECT LIGHTNING PROTECTION, ATTITUDE AND HEADING REFERENCE SYSTEM, AND AIRCRAFT", which claims priority from German Patent Application No. 102021127228.9, filed on Oct. 20, 2021. The entire contents of each of the above-identified patent applications are incorporated herein by reference.

The present invention relates to an electrical device with indirect lightning protection, in particular, for use in an attitude and heading reference system for air navigation or in an aircraft.

High lightning protection requirements are especially in aviation of utmost importance. All installed devices must be provided with lightning protection of different magnitudes (threat level). In case of a high threat level and a large number of wired interface connections between the devices, this can lead to a space requirement in the individual devices that is not to be underestimated. Depending on the requirements and mechanical design, this outlay can take up to a third of the volume in a device.

According to the lightning protection standard DIN EN 62305-4 (VDE 0185-3054), the risk to components from a lightning strike is classified into five threat levels or five lightning protection levels (LPL). In FIG. 6, corresponding characteristic data (the ratio of peak open-circuit voltage to peak short-circuit current at the calibration point Voc (in V)/Isc (in A) for different waveforms 3, 4 and 5a) is allocated to threat levels 1 to 5. Waveform 3 is an attenuated sine wave with a frequency of 1 MHz. Due to the attenuation, the wave still has a residual amplitude of approx. 50% after 5 periods. Waveforms 4 and 5a are a double-exponential pulse. They differ only in their duration. Waveform 4 has a rise time of 6.4 μs and a time to half value of 69 μs. Waveform 5a has a rise time of 40 us and a time to half value of 120 μs. Waveform 5a therefore has the highest energy content.

For an adequate protection of electrical and electronic systems in aircraft against the effects of an electromagnetic lightning pulse, there are different combinations consisting of the following protective measures: earthing and potential equalization, spatial shielding, cable routing and cable shielding. The characteristic values of the protective measures must correspond to the selected threat or lightning protection level.

Electronic devices or electrical devices, particularly those installed in aircraft, require an appropriate lightning protection to be protected against lightning strikes. If lightning strikes an externally mounted device (e.g., an electronic antenna) directly due to an unfavorable arrangement, this is referred to as a "direct lightning strike". This case is not to be considered. If the strike occurs at an arbitrary point in the aircraft hull, the lightning pulse can couple capacitively from there to the interface cable by which the electronic devices communicate with one another. The lightning pulse moves as a wave along the cable and invades the device via the device plug. This is referred to as an "indirect lightning strike". The protective measure required for this is called "indirect lightning protection".

Indirect lightning protection is usually achieved with standardized protective elements. The components for this are: gas arresters, varistors, suppressor diodes and resistors. They are used depending on the pulse energy. The basic principle is to convert the short-term pulse energy due to the indirect lightning strike into heat by means of these components, in particular, by means of a varistor/resistor or gas arrester. The calculations required for this are described in the technical literature (cf. Mel Clarke and Kent Walters (2018): "Lightning protection for aircraft electrical power and data communication systems", publication Micronote 127, Microsemi Corporation).

However, the current lightning protection measures in flying apparatus of all kinds have the following disadvantages. Firstly, the space required for the protective elements increases linearly with the number of externally wired interface connections connected to the device. In addition, the component surface increases exponentially as the threat level increases. This exponential proportion has a significant effect on the volume of the device. For example, if the energy is converted into heat with the aid of a resistor, the energy E and therefore the volume of the component increases in accordance with $E=R \times I2 \times t$ if the resistance R remains constant. In this case, I is the surge current of the lightning pulse that flows into the device on the interface line, and t is the duration of the pulse. In the graph, FIG. 7 shows the relationship between the component surface and the threat level, as well as the disadvantage of the current lightning protection measure. There is approximately a factor of 2.5 between each threat level, by which the current increases in accordance with aviation standard DO-160, Sect. 22. The calculation of the graph in FIG. 7 is made based on a number of conventional digital interfaces in the aviation sector, taking into account existing protective elements.

If the threat level is very high, it is to be assumed that a single protective element will not be sufficient. It is therefore necessary to connect ahead a second, stronger protective element with different technology in series (graded protection). This is most notably necessary for interfaces with low impedance, such as power supply connections. This additional reinforcement of the protection, in turn, leads to even greater space consumption by components.

US 2019/0199137 A1 describes a wireless near-field microwave power transmission system. The wireless power transmission system uses a wireless power transmission device to wirelessly transmit power to a wireless power receiving device. The wireless power transmission device includes microwave antennas that extend along an axis in a staggered arrangement. In the staggered arrangement, the microwave antennas are arranged on alternate sides of the axis. Each microwave antenna extends along a direction that is perpendicular to the axis. Many antennas are in overlap with a wireless power receiving antenna in the wireless power receiving device. A control circuit uses an oscillator and an amplifier circuit to supply driver signals to the antennas that are in overlap with the wireless power receiving antenna. The driver signals may be adjusted based on feedback from the wireless power receiving device to increase power transmission efficiency. The system may include a wireless power transfer device with inductive power transfer coils.

US 2018/0041249 A1 describes an electrical power/data coupler. Such a data and power transmission network comprises an actuator and two power/data couplers. The actuator is connected to the electrical coupler, firstly to transmit electrical power via the power supply pins to the network via the third pin, or to receive data from the network via the fourth pin. This system also comprises a galvanic isolation transformer, a winding, which are connected to the first and the second power supply pins. In addition, the data transfer takes place via a first and a second transformer, which inductively transfer the data from the network to the system and, in turn, inductively transfer data to the network.

The present invention is therefore based on the object of producing an electrical device with indirect lightning protection, in particular, for use in an attitude and heading reference system for air navigation and in an aircraft, which has a reduced size with high lightning protection requirements.

This object is achieved by the electrical device with indirect lightning protection according to claim 1, by the attitude and heading reference system according to claim 11, and by the aircraft according to claim 12. Advantageous embodiments and further embodiments of the invention are given in the sub-claims.

In accordance with the invention, an electrical device with indirect lightning protection is provided, which has an electrically conductive housing within which electrical components are accommodated. Furthermore, the electrical device includes an electrical data interface, which is connected to the electrical components in order to transmit internal electrical signals from the components out of the housing, or to transmit external electrical signals into the housing to the components. Furthermore, an electrical power supply interface is provided, which supplies electrical power to the electronic components from an external power source. The electrical data interface and the electrical power supply interface are configured in such a manner that the electrical components are galvanically isolated from the housing and the input/output lines of the data interface and the power supply interface, so that damage to the components by a lightning-induced current pulse is prevented. For an appropriate use of the electrical device for the air navigation of an aircraft, it is provided in accordance with the invention that the electrical components are adapted to provide attitude and heading reference data for air navigation. For an appropriate implementation of the galvanic isolation of the electrical components from the electrically conductive housing of the electrical device and the input/output lines of the data interface, it is provided in accordance with the invention that the electrical data interface has an external data interface part that is connectable to a peripheral electrical conductor structure and an internal data interface part that is connected to the components, which are galvanically isolated, wherein data transmission between the external and internal data interface parts takes place optically, magnetically, capacitively or mechanically.

The invention therefore relates to an electrical device with indirect lightning protection, which still has a compact design with a small volume and a reduced size even with high lightning protection requirements such as a threat level of greater than 3 (see FIG. 7). Due to the galvanic isolation of the components inside the housing of the electrical device, a lightning-induced current pulse is interrupted in accordance with the invention, where a current caused by a lightning pulse, which in prior art devices has been run in the aircraft cable to the device, inside the device via the aforementioned protective elements such as gas arresters, varistors, suppressor diodes and resistors to the housing and from there to the aircraft hull via the earth connection, no longer runs internally in the device to the housing in accordance with the invention. This means that protective elements with a high space requirement can be dispensed with and, particularly in case of a large number of wired interfaces and a high threat level, both the volume and the weight of the electrical device can be significantly reduced in accordance with the invention.

It is advisable if the electrical components comprise a fiber gyrocompass or a MEMS gyro and electrical circuits for controlling the compass, as well as for evaluating and transmitting the attitude and heading data.

For simple communication in accordance with the applicable data transmission standard in aeronautics, it is advantageous if the electrical data interface is adapted to read and output data digitally, in particular, in the ARINC 429 protocol, in the RS-422 protocol, in the RS-485 protocol, in the CAN protocol, in the ETHERNET protocol, or in the DISCRETE protocol.

For a fail-safe and redundant output of attitude and heading reference data, it is particularly advantageous if the electrical data interface is adapted to output attitude and heading reference data analogously.

Due to an exponential increase in the component surface with the threat level (FIG. 7), it is particularly useful if the electrical components are provided with lightning protection with a threat level greater than or equal to 3 in accordance with DIN EN 62305.

For a particularly simple implementation of the galvanic isolation of the electrical components of the electrical device from the surrounding peripheral circuit and the external power source, it is particularly useful if the electrical power supply interface has an external power supply interface part that is connectable to an external power source and an internal power supply interface part that is connected to the components, which are galvanically isolated, wherein electrical power transmission between the external and the internal power supply interface parts is done by magnetic induction or by transmission of electromagnetic waves.

For particularly effective protection against the lightning-induced voltage pulse of the electrical components, it is advantageous if the electrical components are protected against a lightning-induced voltage pulse by ESD protection diodes.

In order to prevent or at least reduce the probability of a voltage flashover between the lines of the electrical device, it is advantageous if the electrical data interface includes potential equalization elements which are interconnected between two-core differential signal in-put/output lines in order to raise the input/output lines to the same electrical potential in the event of a lightning-induced voltage pulse to prevent a voltage flashover between the lines.

It is advisable for the potential equalization elements to comprise suppressor diodes, varistors or series resistor elements.

According to another particularly advantageous embodiment of the invention, it is advantageous if the input/output lines of the electrical data interface and the power supply interface are arranged spaced apart from one another in such a manner that a voltage flashover between the lines is prevented in the event of a lightning-induced voltage pulse.

It is advisable if a minimum distance between the input/output lines of the electrical data interface and the power supply interface is greater than 2 mm, greater than 2.5 mm, or greater than 3 mm.

The invention further claims an attitude and heading reference system for air navigation that includes an electrical device according to the invention.

Furthermore, in accordance with the invention, an aircraft is provided which comprises the electrical device with indirect lightning protection according to the invention.

The invention is described in detail in the following text, with reference to the figures in an exemplary manner. The subject matter of the invention is defined by the claims.

Identical components and components with the same function are marked with the same reference numeral in the figures.

Figure 1:
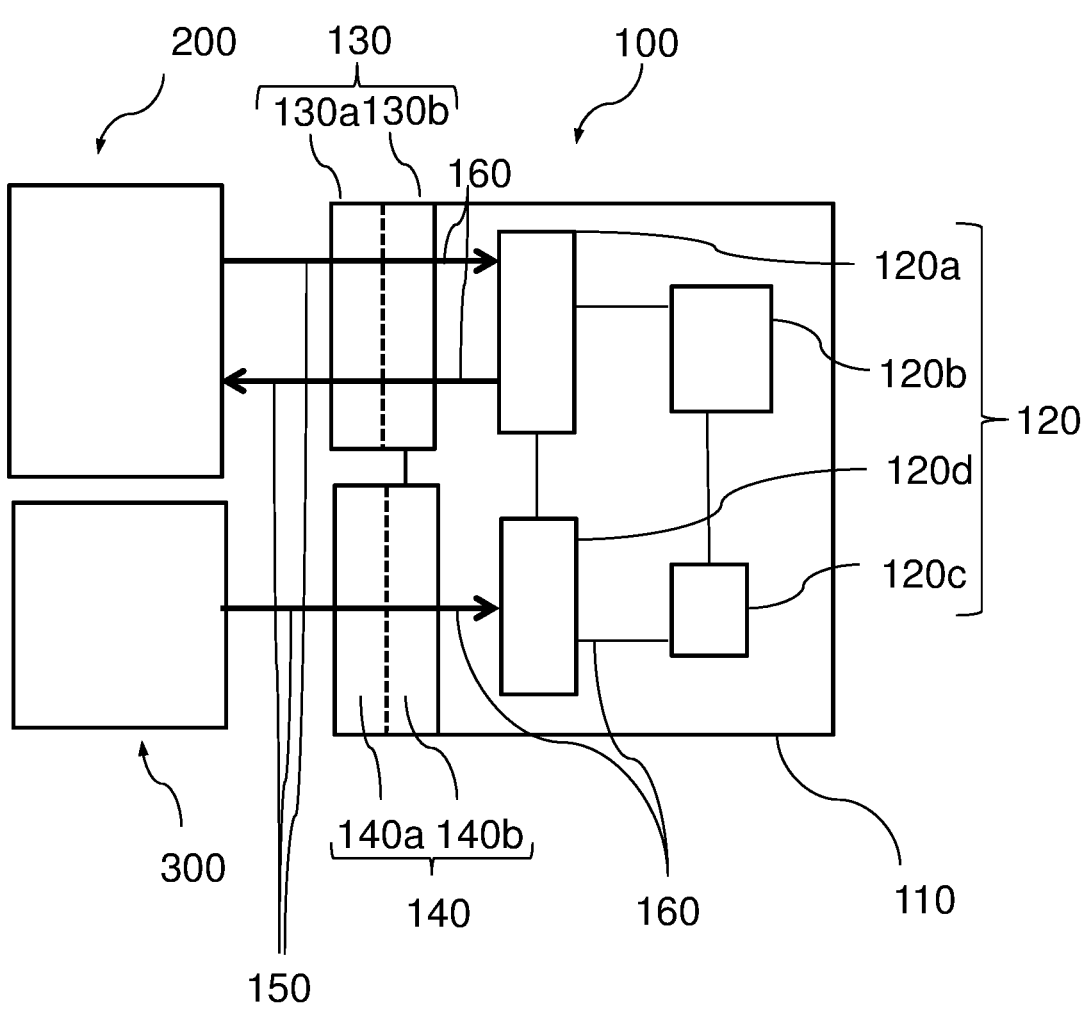
FIG. 1 shows a schematic block diagram of an electrical device with indirect lightning protection according to the invention, which is connected to a peripheral electrical conductor structure and an external power source.

FIG. 1 shows a schematic block diagram of an electrical device 100 with indirect lightning protection, which is connected to a peripheral electrical conductor structure 200 suitable for data transmission and an external power source 300. The electrical device 100 with indirect lightning protection has an electrically conductive housing 110, within which electrical components 120 are accommodated. The electrically conductive housing 110 can be a metallic housing or a housing with a metallic coating. The housing 110 can also be made of an insulating material, where electrical shielding of the electrical components 120 is achieved by means of a wire mesh, as in a Faraday cage. The electrical components are connected to one another via internal connecting lines 160, where data can be transmitted or a power supply can be ensured via the connecting lines 160. The connecting lines 160 are shown therein only schematically and can be designed as simple power supply lines all the way to data transmission bus systems.

The electrical components 120 are connected to an electrical data interface 130 via the internal connecting lines 160 to transmit internal electrical signals from the components 120 out of the housing 110 or to transmit external electrical signals from the peripheral electrical conductor structure 200 into the housing 110 to the components 120. The electrical device 100 further includes an electrical power supply interface 140, which supplies electrical power to the electrical components 120 from an external power source 300. The external power source 300 can be of any type in order to ensure a supply of electrical power to the electrical device 100. However, a power supply with a supply voltage of 28 V direct current, which is common in the aviation sector, is preferred.

As schematically indicated by the dashed lines in FIG. 1 for the electrical data interface 130 and the electrical power supply interface 140, the electrical data interface 130 and the electrical power supply interface 140 are configured in such a manner that the electrical components 120 are galvanically isolated from the housing 110 and the input/output lines 150 of the data interface 130 and the power supply interface 140, so that damage to the components 120 by a lightning-induced current pulse is prevented. In the electrical device according to the invention, all components 120 are therefore configured in a galvanically isolated manner from the housing 110, and the supply to these components 120 is also galvanically isolated from the housing 110.

Even if the electrical device with indirect lightning protection according to the invention is not intended to be limited in its application to aviation, it is nevertheless preferred if the electrical components 120 are adapted to provide attitude and heading reference data for air navigation. In so doing, the electrical components 120 can assume different functions. For example, one of the electrical components 120 can be a data transmission unit 120a, which is electrically connected to an internal data interface part 130b in order to send, via the electrical data interface 130, internal electrical signals from the components 120 to a peripheral electrical conductor structure 200 in a galvanically isolated manner. Furthermore, when the electrical device 100 is used as an attitude and heading reference component for air navigation, one of the electrical components 120 may be a fiber gyrocompass 120b through which attitude and heading reference data is provided. In addition, electrical circuits 120c may be provided for controlling the compass 120b, as well as for evaluating and transmitting the attitude and heading data. Finally, the electrical device 100 may have a central processor unit 120d by which the operation of the electrical device 100, in particular, the control of the compass, as well as the evaluation and transmission of the attitude and heading data, is monitored and controlled. The electrical device 100 may also be designed as a data distribution mechanism, as a data compression mechanism, or as a flight control device.

In general, the electrical device 100 can be a device that must fulfill high lightning protection requirements and at the same time is particularly at risk, for example, due to a high number of interfaces.

In an embodiment of the electrical device 100 with indirect lightning protection as part of an attitude and heading reference system (AHRS) with a fiber optic gyro (FOG), the data can be output in the ARINC 429 format, as is standard in aviation. The electrical data interface 130 is therefore adapted to read and output data digitally. However, attitude and heading reference data can optionally also be output via analog interfaces (for example, a synchro interface). Thus, the electrical data interface 130 is also adapted to output attitude and heading reference data analogously. The high accuracy of the sensors installed in the electrical components 120 of the electrical device 100 allows autonomous heading alignment (gyro compassing). Thus, interference-prone magnetic sensors for heading alignment can be completely omitted.

With reference to FIGS. 2A to 2D, the galvanic isolation of the electrical components 120 of the housing 110 and the input/output lines 150 of the data interface 130 and the power supply interface 140 is to be described in the following text. For the galvanic isolation, the electrical data interface 130 has an external data interface part 130a that is connectable to the peripheral electrical conductor structure 200 via the input/output lines 150 and the internal data interface part 130b that is connected to the electrical components 120 via the internal connecting lines 160. The external data interface part 130a and the internal data interface part 130b are galvanically isolated, i.e., electrically isolated from one another, where data transmission between the external and the internal data interface parts 130a, 130b can, for example, be provided in the ways shown in FIGS. 2A to 2D.

Figure 2A:
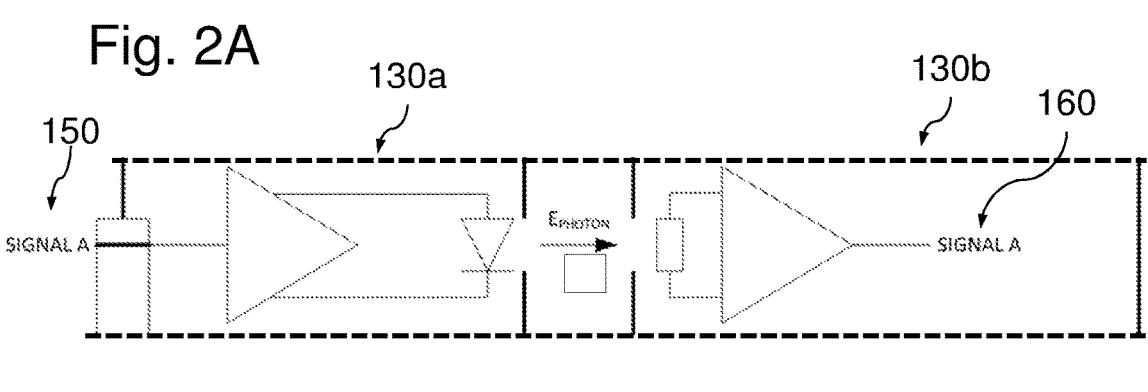
FIG. 2A to FIG. 2D show schematic circuit diagrams of a data interface and a power supply interface of the electrical device according to the invention.

Thus, according to FIG. 2A, an input signal from the peripheral electrical conductor structure 200 on an input line 150, which is designated as signal A, can be converted into an optical signal (EPhoton) in the external data interface part 130a by means of an amplifier and a light-emitting diode, and converted again into an electrical input signal A, which corresponds to the signal A on the input side of the external data interface part 130a, in the internal data interface part 130b by means of a photodiode and an amplifier. The electrical signal A of the internal data interface part 130b is then routed to the components 120 via the internal connecting lines 160.

Figure 2B:
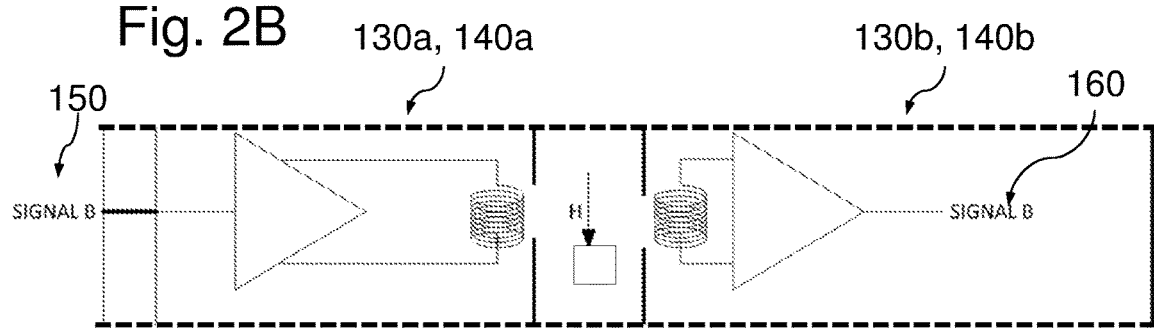

Analogous to FIG. 2A, data transmission with simultaneous galvanic isolation can be achieved by the magnetic coupling of two coils through a magnetic field H as shown in FIG. 2B.

Figure 2C:
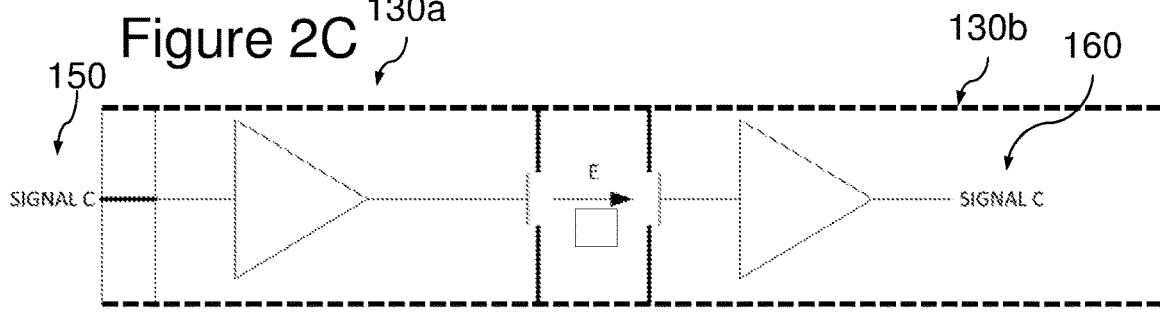

Another data transmission possibility is shown in FIG. 2C, in which a signal C in the external data interface part 130a is converted into electrical charge on a capacitor plate (connected to an electrical field E) by an amplifier through a capacitive coupling and this opposite charge is converted back again into the signal C on the opposite capacitor plate in the internal data interface part 130b by means of an amplifier.

Figure 2D:
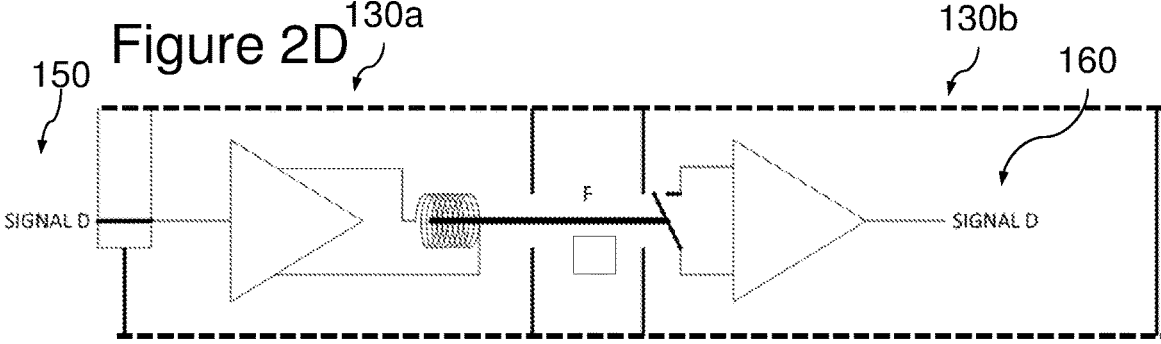

For non-time-limited signals, it is theoretically also conceivable that, as shown in FIG. 2D, a switching signal D in the external data interface part 130a is supplied to a mechanical switching relay by means of an amplifier, whereby a mechanical switch in the internal data interface part 130b is actuated by a force transmission by force F, whereby the switching signal D can be transmitted to the components 120 in a galvanically isolated manner from a peripheral electrical conductor structure 200.

Thus, data transmission between the external data interface part 130a and the internal data interface part 130b can therefore be done optically (FIG. 2A), magnetically (FIG. 2B), capacitively (FIG. 2C), mechanically (FIG. 2D) or generally by transmission of electromagnetic waves (for example, also in the non-optical radio range, where appropriately designed trans-mitting/receiving antennas are being used). The separation of the signals from the rest of the electronics is therefore mainly achieved by optical, magnetic, electrical or mechanical transmission techniques, as shown in FIGS. 2A to 2D. Although FIGS. 2A to 2D have initially been described only in terms of signal inputs, it is clear that for transmission of signals from an internal data interface 130b to an external data interface 130a, the same technique as shown in FIGS. 2A to 2D is used in the reverse direction.

Consistent galvanic isolation also requires a power supply of the interface components to be configured in a galvanically isolated manner. Due to the low power consumption for the driver and receiver components 120, the space required for this is small. In aviation, a power supply with direct current and a supply voltage of 28 V is used, with the input voltage of 28 V running via a direct current converter. In this case, galvanic isolation is already given, as a direct current transformer works in a similar way to an alternating current transformer via inductive coupling.

Thus, in accordance with the invention, an electrical device 100 with indirect lightning protection is produced, in which all wired interface and power supply connections from and to the device are configured in a galvanically isolated manner. For this purpose, the electrical power supply interface 140 also has an external power supply interface part 140a that is connectable to the external power source 300 and an internal power supply interface part 140b that is connected to the components, which are also galvanically isolated, wherein electrical power transmission between the external and the internal power supply interface parts 140a, 140b is done by magnetic induction (FIG. 2B) or by transmission of electromagnetic waves.

Galvanic isolation of the electrical device from its surroundings can therefore prevent damage to the components 120 caused by a lightning-induced current pulse. In addition to protection against damage caused by a lightning-induced current pulse, lightning protection against a lightning-induced voltage pulse is also necessary.

Figure 3:
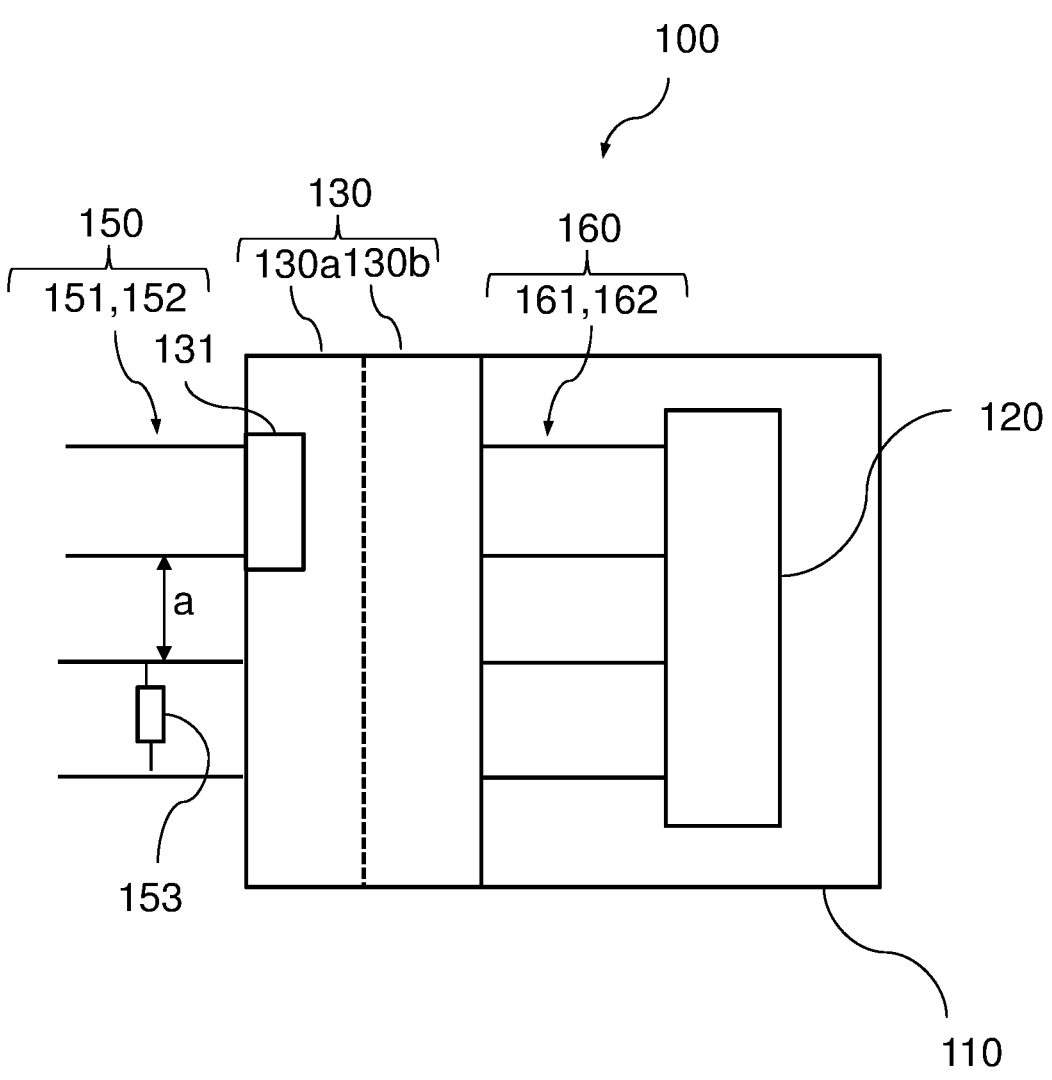
FIG. 3 shows a detailed schematic block diagram of a data interface of the electrical device with indirect lightning protection according to the invention.

Lightning protection measures against damage caused by a lightning-induced voltage pulse are illustrated schematically in the block diagram in FIG. 3. The lightning protection measures are described using the example of the data interface 130, but are also applicable to the power supply interface 140 of the electrical device 100. As shown in FIG. 3, for example, protection against a lightning inducing voltage pulse can be achieved in that at least one so-called ESD (electrostatic discharge) protection 131 is provided in the area of the electrical data interface 130a between two-core differential signals on input lines. Particularly active components such as drivers, receivers and controllers must be generally protected against a high voltage pulse. Due to the low current, ESD protection is sufficient in this case. In some drivers and receivers, this is already integrated in the component through existing ESD protection diodes, so that no additional effort is required. An ESD protection diode, for example, can be implemented by a tunnel diode connected in the reverse direction.

In case of two-core differential signals on output lines 150 with the lines 151, 152, potential equalization elements 153 can be additionally installed so that all electrical inputs/outputs are raised to the same potential in the event of a lightning pulse and thus no voltage flashover occurs. This is necessary because the distance between the pins of the components 120 is small for reasons related to the manufacturer in order to save space, especially in case of high voltage pulses. The electrical data interface 130 can therefore include potential equalization elements 153 that are interconnected between two-core differential signal input/output lines 151, 152 in order to raise the input/output lines 150 to the same electrical potential in the event of a lightning-induced voltage pulse to prevent a voltage flashover between the lines. Since the internal connecting lines 160 are located behind the insulation of the electrical data interface 130 and within the shielding, no potential equalization elements need to be provided between the two-core connecting lines 161, 162. A suppressor diode, the size of which is individually adapted to the type of interface and the threat level, is sufficient as a potential equalization element 153. Series resistors in the signal lines 150 also fulfill this purpose.

To prevent a voltage flashover between different interface lines, all conductor tracks of the input/output lines 150 can also have a sufficient distance a between them. Furthermore, a device plug (both male and female parts) connected to the external data interface part 130a with a sufficient pin spacing a can also be used.

Thus, the input/output lines 150 of the electrical data interface 130 and the power supply interface 140 are conveniently arranged spaced apart from one another in such a manner that a voltage flashover between the lines 150 is prevented in the event of a lightning-induced voltage pulse. A minimum distance a between the input/output lines 150 of the electrical data interface 130 and the power supply interface 140 may be greater than 2 mm, greater than 2.5 mm, greater than 3 mm, greater than 3.5 mm, greater than 4 mm, greater than 4.5 mm, or greater than 5 mm. In the event that it is not desired to increase a pin spacing a in the front unit of the external data interface part 130a, a local coating of the printed circuit board can also be used.

Figure 4:
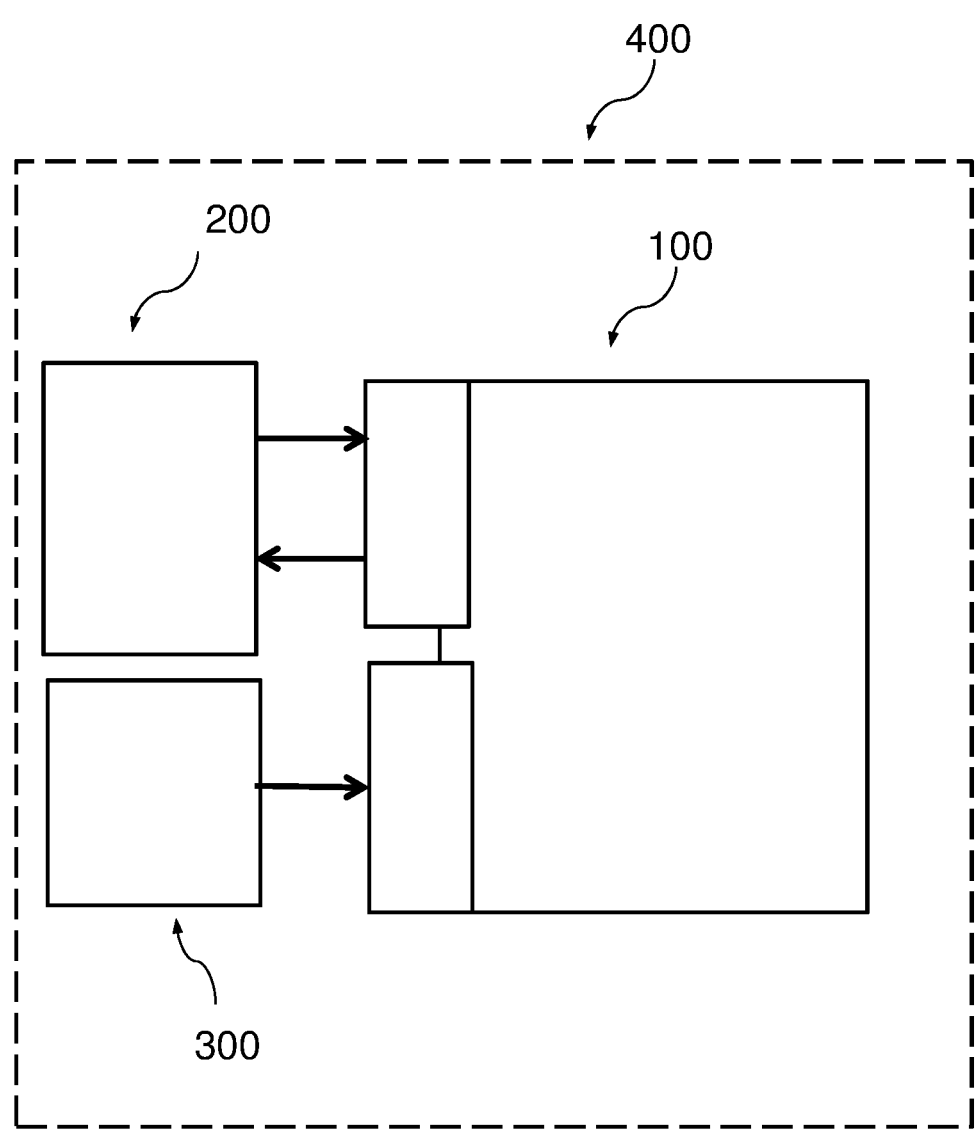
FIG. 4 shows an attitude and heading reference system for air navigation according to the invention.
Figure 5:
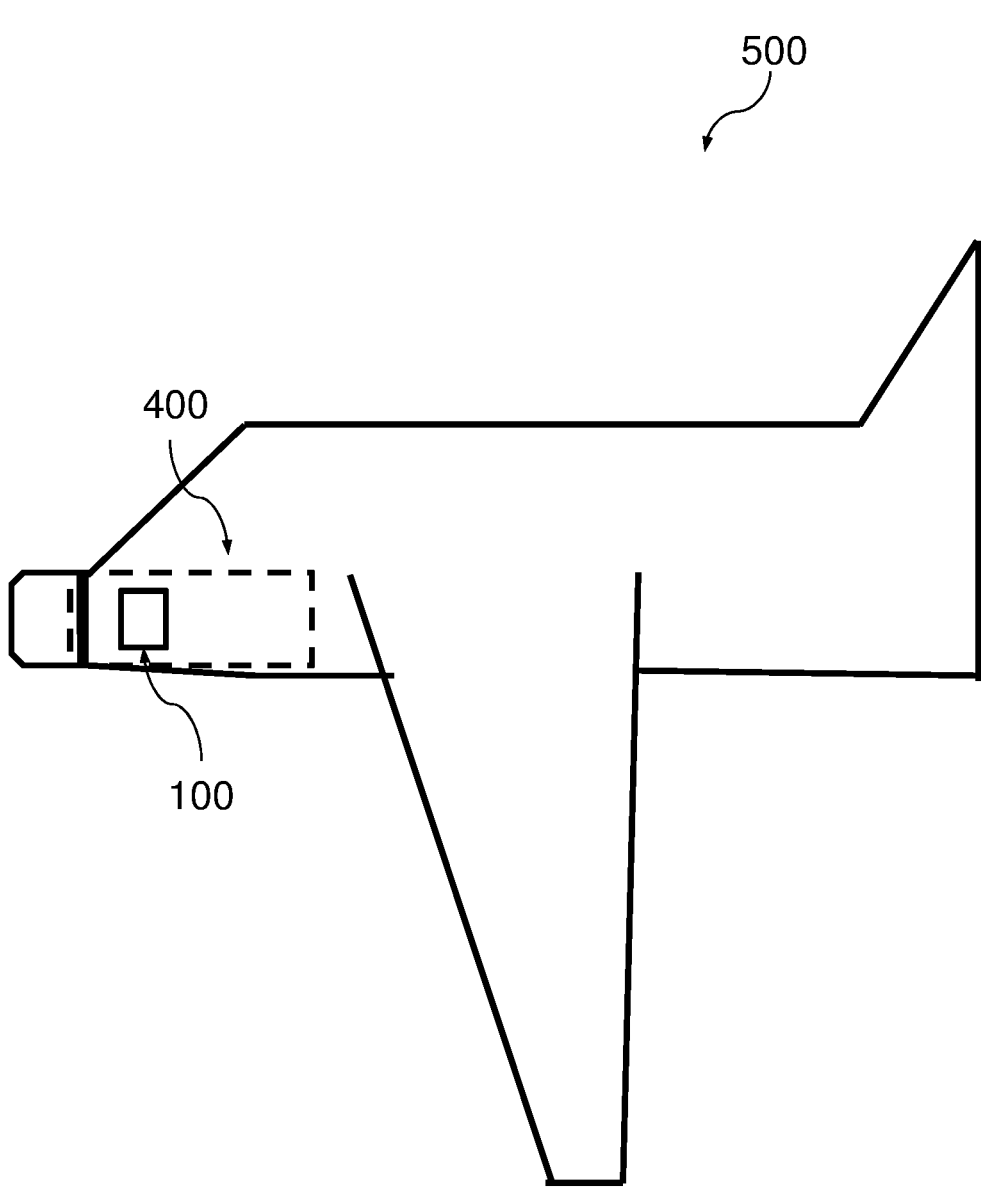
FIG. 5 shows an aircraft comprising an electrical device according to the invention.

FIG. 4 shows a schematic block diagram of an attitude and heading reference system 400 for air navigation, which comprises the electrical device 100, the peripheral electrical conductor structure 200 for further data transmission, and an external power source 300. An attitude and heading refer- ence system (AHRS) 400 is to be understood as a system which is prefer-ably installed in an aircraft 500, which is shown schematically in FIG. 5. The system 400 is intended to comprise all involved electronic devices involved in the air navigation of the aircraft 500. The term aircraft 500 is intended to be generally understood to mean a flying appa- ratus, which also includes helicopters and airships. Thus, an aircraft 500 which uses the electrical device and/or the attitude and heading reference system 400 according to the invention in a particularly useful manner may be a turboprop aircraft, a business jet, an IFR helicopter, a regional plane or even military COTS applications.

Figures 6, 7:
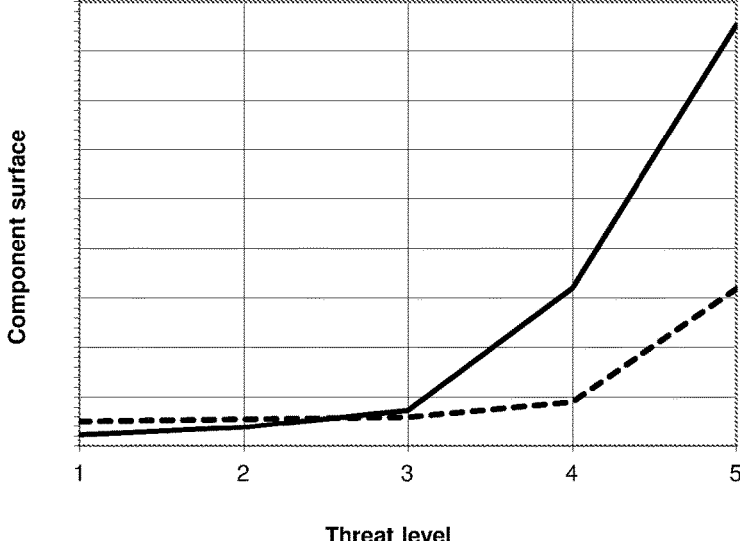
FIG. 6 shows a table with characteristic data of threat levels 1 to 5 according to lightning protection standard DIN EN 62305.
FIG. 7 shows a schematic diagram showing the required component surface depending on the threat level according to lightning protection standard DIN EN 62305.

In accordance with the invention, an electrical device 100 with indirect lightning protection is thus provided, which has a compact design with a reduced volume even at high threat levels, since conventional protective elements such as gas arresters, varistors, suppressor diodes or resistors do not have to be used due to the galvanic isolation of the compo- nents 120 from an external current source 300 and a periph- eral electrical conductor structure 200. The increase in the space required due to the increasing insulation requirement, as well as due to the simple protective elements 131 and 153 shown in FIG. 3, which are required for differential data lines, can be seen in FIG. 7 in the slight increase in the dashed line.

The solid exponential line shows a component surface with conventional prior art components, whereas the dashed line shows a component surface of the electrical device 100 with indirect lightning protection according to the invention. This does not include the negligible additional space required for the galvanic isolation of the power supply. When looking at FIG. 7, the significant saving of space on the printed circuit board is most noticeable from threat level 3. It is therefore preferred that the electrical components 120 are provided with lightning protection with a threat level greater than or equal to 3 in accordance with DIN EN 62305. The lack of the aforementioned protective elements and the associated smaller housing volume of the housing 110 lead to a reduction in weight. This is a top priority, especially in aviation. The costs are calculated by comparing the protective elements saved and the galvanic insulating elements with their associated drivers. They are at a similar level. This means that the solution according to the invention can be achieved in a cost-neutral manner.

The invention offers the possibility to dispense with the protective elements that are generally classified as critical. Under normal operating conditions, they are without func- tion, as a result of which a failure of a protective element may perhaps not be noticed until the next service interval of an aircraft. If a protective element fails, the lightning pulse can invade the electronics of a prior art device via this line and thus lead to a total failure of this device. This, in turn, can jeopardize the safety of the flight. Without these pro- tective elements, this risk no longer exists. When the solu- tion according to the invention is implemented, the failure of a component means that data can no longer be transmitted on this interface line.

This failure would then be reported to the pilot via another signal line, giving them the opportunity to make a safety- relevant decision.

In accordance with the invention, an electrical device 100 with indirect lightning protection is thus provided, in which an electrical device with galvanically isolated potentials is provided. The galvanic isolation for a data interface accord- ing to the invention can be achieved by various transmission types such as optical, magnetic, capacitive, electrical, mechanical or electromagnetic by means of radio waves. In so doing, the galvanic isolation can be achieved individually or in combination for analog, digital and power supply line inputs. Another possibility is to implement galvanic isola- tion for individual conductors (serial bus systems), differ- ential conductors or parallel bus lines. Transmission of the signals in the galvanically isolated area of the external and the internal data interface parts 130a, 130b, as well as the external and the internal power supply interface parts 140a, 140b can be made via media such as air, gas, electrolytes, glass fiber or plastic fiber.

The invention claimed is:

1. An electrical device with indirect lightning protection, comprising:

an electrically conductive housing, within which electri- cal components are accommodated, wherein the elec- trical components are adapted to provide attitude and heading reference data for air navigation, an electrical data interface, which is connected to the electrical components in order to transmit internal electrical signals from the components out of the hous- ing, or to transmit external electrical signals into the housing to the components, an electrical power supply interface, which supplies elec- trical power to the electrical components from an external power source, wherein the electrical data interface and the electrical power supply interface are configured in such a manner that the electrical components are galvanically isolated from the housing and from the input/output lines of the data interface and the power supply interface, so that damage to the components by a lightning-induced current pulse is prevented, and wherein the electrical data interface has an external data interface part that is connectable to a peripheral elec- trical conductor structure and an internal data interface part that is connected to the components, which are galvanically isolated, wherein data transmission between the external and the internal data interface parts is done optically, and wherein the electrical data interface includes potential equalization elements which are interconnected between two-core differential signal input/output lines in order to raise the input/ output lines to the same electrical potential in the event of a lightning-induced voltage pulse to prevent a volt- age flashover between the lines.

2. The electrical device according to claim 1, wherein the electrical components comprise a fiber gyrocompass or a MEMS gyro and electrical circuits for controlling the com- pass, as well as for evaluating and transmitting the attitude and heading data.

3. The electrical device according to claim 1, wherein the electrical data interface is adapted to read and output data digitally, in particular, in the ARINC 429 protocol, in the RS-422 protocol, in the RS-485 protocol, in the CAN protocol, in the ETHERNET protocol, or in the DISCRETE protocol.

4. The electrical device according to claim 1, wherein the electrical data interface is adapted to output attitude and heading reference data analogously.

5. The electrical device according to claim 1, wherein the electrical components are provided with lightning protection of a threat level greater than or equal to 3 in accordance with DIN EN 62305.

6. The electrical device according to claim 1, wherein the electrical power supply interface has an external power supply interface part that is connectable to an external power source and an internal power supply interface part that is connected to the components, which are galvanically isolated, wherein electrical power transmission between the external and the internal power supply interface parts is done by magnetic induction or by transmission of electromagnetic waves.

7. The electrical device according to claim 1, wherein the electrical components are protected from a lightning-induced voltage pulse by ESD protection diodes.

8. The electrical device according to claim 1, wherein the potential equalization elements comprise suppressor diodes, varistors, or series resistor elements.

9. The electrical device according to claim 1, wherein the input/output lines of the electrical data interface and the power supply interface are arranged spaced apart from one another in such a manner that a voltage flashover between the lines is prevented in the event of a lightning-induced voltage pulse.

10. The electrical device according to claim 1, wherein a minimum distance between the input/output lines of the electrical data interface and the power supply interface is greater than 2 mm, greater than 2.5 mm, or greater than 3 mm.

11. An attitude and heading reference system for air navigation, comprising an electrical device according to claim 1.

12. An aircraft comprising an electrical device according to claim 1.

\* \* \* \* \*